United States Patent
Yamada et al.

(10) Patent No.: US 11,895,693 B2
(45) Date of Patent: Feb. 6, 2024

(54) RANDOM ACCESS WIRELESS COMMUNICATION SYSTEM AND RANDOM ACCESS WIRELESS COMMUNICATION METHOD

(71) Applicant: NIPPON TELEGRAPH AND TELEPHONE CORPORATION, Tokyo (JP)

(72) Inventors: Tomoyuki Yamada, Musashino (JP); Keisuke Wakao, Musashino (JP); Kenichi Kawamura, Musashino (JP); Akira Kishida, Musashino (JP); Shota Nakayama, Musashino (JP); Yasushi Takatori, Musashino (JP); Takatsune Moriyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 376 days.

(21) Appl. No.: 17/422,889

(22) PCT Filed: Jan. 6, 2020

(86) PCT No.: PCT/JP2020/000071
§ 371 (c)(1),
(2) Date: Jul. 14, 2021

(87) PCT Pub. No.: WO2020/149161
PCT Pub. Date: Jul. 23, 2020

(65) Prior Publication Data
US 2022/0070886 A1    Mar. 3, 2022

(30) Foreign Application Priority Data
Jan. 16, 2019    (JP) ................. 2019-005555

(51) Int. Cl.
*H04W 72/566* (2023.01)
*H04W 74/08* (2009.01)

(52) U.S. Cl.
CPC ..... *H04W 72/566* (2023.01); *H04W 74/0833* (2013.01)

(58) Field of Classification Search
CPC .......... H04W 72/566; H04W 74/0833; H04W 74/0816; H04W 84/12; H04W 28/02
(Continued)

(56) References Cited

U.S. PATENT DOCUMENTS

2003/0203735 A1* 10/2003 Andrus ............. H04W 36/0085
455/450
2008/0181150 A1* 7/2008 Won ........................ H04L 47/50
370/310
2013/0136072 A1* 5/2013 Bachmann ............ H04W 68/02
370/329

OTHER PUBLICATIONS

Alexander L. Stolyar and Kavita Ramanan, Largest Weighted Delay First Scheduling: Large Deviations and Optimality, The Annals of Applied Probability, vol. 11, No. 1, 2001, pp. 1-48.

* cited by examiner

*Primary Examiner* — Michael Y Mapa
(74) *Attorney, Agent, or Firm* — Harness, Dickey & Pierce, P.L.C.

(57) ABSTRACT

In a random access radio communication system configured to perform downlink communication from a radio base station to radio terminals by random access, the radio terminals include one or more low latency terminals requiring low latency and one or more non-low latency terminals not requiring low latency, and the low latency terminals and the non-low latency terminals are configured to be distinguished by service set identifiers (SSIDs). The random access radio communication system includes terminal assignment destination control unit of distinguishing the low (Continued)

latency terminals and the non-low latency terminals in accordance with the SSIDs and evenly distributing the terminals into a plurality of communication channels, and random access control unit of performing priority control on the low latency terminals and the non-low latency terminals for each communication channel so that the downlink communication in the low latency terminal satisfies a predetermined delay time.

8 Claims, 3 Drawing Sheets

(58) Field of Classification Search
USPC .................. 370/329, 238, 395.21, 508, 519; 455/450–452.1
See application file for complete search history.

RANDOM ACCESS WIRELESS COMMUNICATION SYSTEM AND RANDOM ACCESS WIRELESS COMMUNICATION METHOD

CROSS-REFERENCE TO RELATED APPLICATIONS

This application is a 371 U.S. National Phase of International Application No. PCT/JP2020/000071 filed on Jan. 6, 2020, which claims priority to Japanese Application No. 2019-005555 filed on Jan. 16, 2019. The entire disclosures of the above applications are incorporated herein by reference.

TECHNICAL FIELD

The present invention relates to a random access radio communication system and a random access radio communication method that enable low latency communication in random access.

BACKGROUND ART

In the related art, in a radio communication system using random access, a method in which, in a case where a terminal (low latency terminal) requiring low latency and a terminal (non-low latency terminal) not requiring a low latency are mixed, the low latency terminal and the non-low latency terminal are separated into communication channels that do not conflict in random access.

For example, there is a method in which a low latency terminal A is assigned to a communication channel CH1 of an access point, a low latency terminal B is assigned to a communication channel CH2, and a non-low latency terminal is assigned to a communication channel CH3. The random access control is performed for each communication channel.

CITATION LIST

Non Patent Literature

Non Patent Literature 1: A. L. Stolyar and K. Ramanan, "LARGEST WEIGHTED DELAY FIRST SCHEDULING: LARGE DEVIATIONS AND OPTIMALITY", The Annals of Applied Probability, 2001, Vol. 11, No. 1, pp. 1-48

SUMMARY OF THE INVENTION

Technical Problem

In the related art, it is necessary to prepare a plurality of communication channels to separate a low latency terminal and a non-low latency terminal into separate communication channels that do not conflict in random access, in accordance with the number of terminals to be assigned. In order to accommodate the low latency terminal, it is necessary to prepare a communication channel having a limited number of terminals to be assigned to satisfy low latency characteristics. On the other hand, the number of terminals to be assigned to a communication channel among non-low latency terminals may be greater than the number of terminals to be assigned to a communication channel among low latency terminals. However, in order to satisfy a predetermined delay time, it is necessary to limit the number of terminals to be assigned, and predetermined or more capacity is required for a communication channel of the non-low latency terminal.

As described above, it is necessary to prepare communication channels that do not conflict in random access in accordance with the number of low latency terminals and the number of non-low latency terminals. In addition, because there is no flexibility, waste of the communication channel is caused.

An object of the present invention is to provide a random access radio communication system and a random access radio communication method that enable low latency communication in random access without preparing separate communication channels when the low latency terminal and the non-low latency terminal are mixed.

Means for Solving the Problem

According to a first aspect, there is provided a random access radio communication system configured to perform downlink communication from a radio base station to radio terminals by random access. In the random access radio communication system, the radio terminals include one or more low latency terminals requiring low latency and one or more non-low latency terminals not requiring low latency, and the low latency terminals and the non-low latency terminals are configured to be distinguished by service set identifiers (SSIDs). The random access radio communication system includes a terminal assignment destination control unit configured to distinguish the low latency terminals and the non-low latency terminals in accordance with the SSIDs and evenly distribute the low latency terminals and the non-low latency terminals into a plurality of communication channels, and a random access control unit configured to perform priority control on the low latency terminals and the non-low latency terminals for each of the plurality of communication channels so that the downlink communication in each of the low latency terminals satisfies a predetermined delay time.

In the random access radio communication system in the first aspect, the random access control unit is configured to set an access control parameter causing an access authority acquisition probability of a radio section of each of the low latency terminals to be greater than an access authority acquisition probability of the radio section of each of the non-low latency terminals, or to set an access control parameter causing a frequency of inputting a downlink packet to a transmission buffer in each of the low latency terminals to be greater than a frequency of inputting a downlink packet to a transmission buffer in each of the non-low latency terminals.

In the random access radio communication system in the first aspect, the low latency terminals are classified into a plurality of categories, an individual SSID among the SSIDs is assigned to each of the low latency terminals, and the terminal assignment destination control unit is configured to distinguish the low latency terminals of the plurality of categories and the non-low latency terminals in accordance with the SSIDs and to evenly distribute the low latency terminals of the plurality of categories and the non-low latency terminals into the plurality of communication channels.

In the random access radio communication system in the first aspect, the terminal assignment destination control unit is configured to evenly distribute the low latency terminals and the non-low latency terminals into the plurality of communication channels again, in a case where the number of the low latency terminals to be assigned or the number of the non-low latency terminals to be assigned for each of the SSIDs is changed.

According to a second aspect, there is provided a random access radio communication method of performing downlink communication from a radio base station to radio terminals by random access. In the random access radio communication method, the radio terminals include one or more low latency terminals requiring low latency and one or more non-low latency terminals not requiring low latency, and the low latency terminals and the non-low latency terminals are configured to be distinguished by service set identifiers (SSIDs). The random access radio communication method includes distinguishing the low latency terminals and the non-low latency terminals in accordance with the SSIDs and evenly distributing the low latency terminals and the non-low latency terminals into a plurality of communication channels, and performing priority control on the low latency terminals and the non-low latency terminals for each of the plurality of communication channels so that the downlink communication in each of the low latency terminals satisfies a predetermined delay time.

In the random access radio communication method in the second aspect, in a case where the priority control is performed, an access control parameter causing an access authority acquisition probability of a radio section of each of the low latency terminals to be greater than an access authority acquisition probability of the radio section of each of the non-low latency terminals is set, or an access control parameter causing a frequency of inputting a downlink packet to a transmission buffer in each of the low latency terminals to be greater than a frequency of inputting a downlink packet to a transmission buffer in each of the non-low latency terminals is set.

In the random access radio communication method in the second aspect, the low latency terminals are classified into a plurality of categories, an individual SSID among the SSIDs is assigned to each of the low latency terminals, and in a case where the low latency terminals and the non-low latency terminals are distinguished in accordance with the SSIDs, the low latency terminals of the plurality of categories and the non-low latency terminals are distinguished in accordance with the SSIDs and the low latency terminals of the plurality of categories and the non-low latency terminals are evenly distributed into the plurality of communication channels.

In the random access radio communication method in the second aspect, in a case where the low latency terminals and the non-low latency terminals are distinguished in accordance with the SSIDs, the low latency terminals and the non-low latency terminals are evenly distributed into the plurality of communication channels again, in a case where the number of the low latency terminals to be assigned or the number of the non-low latency terminals to be assigned for each of the SSIDs is changed.

Effects of the Invention

According to the present invention, low latency terminals and non-low latency terminals are evenly distributed into a plurality of communication channels, and priority control is further performed for each communication channel, and thus it is possible to optimally and flexibly control the delay time of the low latency terminal and the non-low latency terminal while using radio resources to the maximum.

DESCRIPTION OF EMBODIMENTS

According to the present invention, for STAs (terminals) assigned to an AP (access point) in a random access radio communication system, a low latency terminal and a non-low latency terminal are distinguished by the respective SSIDs. The AP evenly distributes the low latency terminal and the non-low latency terminal into a plurality of communication channels in accordance with the SSIDs, and further performs priority control on the low latency terminal and the non-low latency terminal for each communication channel.

Figure 1:
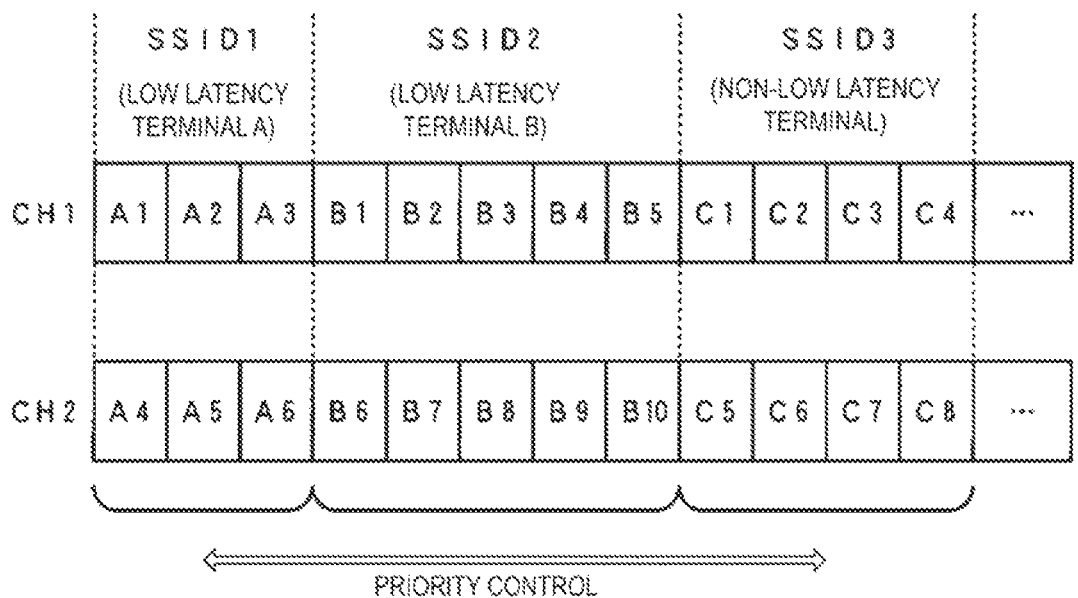
FIG. 1 is a diagram illustrating an assignment relation between an AP and a STA in a random access radio communication system according to the present invention.

FIG. 1 illustrates an assignment relation between an AP and a STA in a random access radio communication system according to the present invention.

In FIG. 1, it is assumed that 24 STAs in total, which are assigned to the AP are low latency terminals A1 to A6 having SSID1, low latency terminals B1 to B10 having SSID2, and non-low latency terminals C1 to C8 having SSID3.

The AP includes communication channels CH1 to CHn (n is an integer of 2 or more) that do not conflict with each other. Here, the STAs are evenly distributed into the communication channels CH1 and CH2 for each SSID. That is, the low latency terminals A1 to A6 having SSID1 are divided into two sets of three each, the low latency terminals A1 to A3 are assigned to the communication channel CH1, and the low latency terminals A4 to A6 are assigned to the communication channel CH2. Similarly, the low latency terminals B1 to B10 having SSID2 are divided into two sets of five each. The low latency terminals B1 to B5 are assigned to the communication channel CH1, and the low latency terminals B6 to B10 are assigned to the communication channel CH2. Similarly, the non-low latency terminals C1 to C8 having SSID3 are divided into two sets of four each. The non-low latency terminals C1 to C4 are assigned to the communication channel CH1, and the non-low latency terminals C5 to C8 are assigned to the communication channel CH2. Thus, the low latency terminals and non-low latency terminals are evenly assigned to the communication channels CH1 and CH2 with being mixed.

In the communication channels CH1 and CH2 that do not conflict with each other, random access control (CSAM/CA) is performed. At this time, priority control is performed on the low latency terminals A and B and the non-low latency terminal C so that the low latency terminals A and B satisfy the respective predetermined delay times.

Although the low latency terminals A and B of the two categories are assumed here for the low latency terminal, terminals of even one category or three categories or more are evenly distributed to the communication channels. This is the same for the non-low latency terminal C.

In a case where the number of STAs having the same category, to which the common SSID is assigned is not an integer multiple of the number of communication channels of the AP, the number of STAs distributed into the respective communication channels is not necessarily even for each SSID (category), but the terminals are distributed to fit the difference of one unit permitted in the priority control.

In the AP, packets of the low latency terminals A and B and packets of the non-low latency terminal C are transmitted with priority order. Thus, the number of packets (referred to as "buffering out rate" below) per unit time, which are transmitted from a buffer in a radio section and then processed varies. If the buffering out rate is different, the number of packets accumulated in the buffer is different even though input traffic is the same, and a time until the packet which has entered into the buffer leaves the buffer, that is, a delay time is different. At this time, the limit input traffic amount that does not overflow the buffer is also different, and the probability distribution of the number of packets accumulated in the buffer is also different. The value of the probability distribution of the number of packets accumulated in the buffer is shifted to a larger value as the packets have a lower buffering out rate.

The packets of the low latency terminals A and B are transmitted with raised priority order, and thus it is possible to increase the buffering out rate, increase the limit input traffic amount, and shift the value of the probability distribution of the number of packets accumulated in the buffer at the time of receiving certain input traffic to a smaller value. Thus, it is possible to shift the value of the probability distribution of the delay time to the smaller value.

There are two methods of prioritizing the transmission of packets.

A first method is a method of performing prioritizing by a difference in access authority acquisition probability of a packet in a radio section. For example, in a wireless LAN, a mechanism of the priority control of a radio section, such as an enhanced distributed channel access (EDCA) is provided.

A second method is a method of performing prioritizing by changing a frequency percentage of entering packets into a transmission buffer even though the access authority acquisition probabilities of the packets in the radio section is equal to each other (Non Patent Literature 1). If the number of packets entering into the transmission buffer is different, the transmission opportunities are naturally different, and thus it is possible to perform prioritizing.

In the EDCA of a wireless LAN, as an example of the first method, if the access authority acquisition probability is changed, the processing time in the radio section is also changed at the same time. Since the processing time in the radio section also constitutes a portion of the delay time, the delay time is shortened by shortening the processing time in the radio section. However, the effect is small in comparison to the effect of reducing the number of packets accumulated in the buffer by increasing the buffering out rate due to the increased transmission opportunities.

In the second method, in a case where the priority order is set for each category, and the order in which packets enter into the transmission buffer for each category is determined by round robins, when there is no packet to be transmitted to the category even though the turn comes to a certain category, a process in which a packet of a category having the next priority order obtains the transmission opportunity is required.

For the "priority order", not only the order but also the "priority degree" being a real number may be given as an attribute. For example, it is a case that the access authority acquisition probability of traffic in a category having a first priority order is 0.6, and the access authority acquisition probability of traffic in a category having a second priority order is 0.4.

Here, relations between the "priority degree", the "input traffic amount", the "buffer filling degree", and the "limit input traffic amount" will be described.

Firstly, "input traffic amounts" of the low latency terminal and the non-low latency terminal are given. At this time, an influence of the "priority degree" on the "buffer filling degree" and the "limit input traffic amount" is as follows. When the "priority degree" is high, the packet is preferentially transmitted, so even with the same "input traffic amount", the "limit input traffic amount" increases, and the distribution of the "buffer filling degree" is also shifted to a smaller value.

In a case where the "priority degree" of the packets of the low latency terminal is increased and the packet of the low latency terminal is processed promptly, the buffer of the low latency terminal for the packet may be empty. At this time, because the packets of the non-low latency terminal can be transmitted using the transmission opportunities for packets of the low latency terminal, the packets of the non-low latency terminal may also be processed promptly.

From the above description, if the "input traffic" is measured, and the "priority degree" is adaptively changed, it is possible to change the "buffer filling degree" and the "limit input traffic amount" and to control the delay time to some extent.

Figure 2:
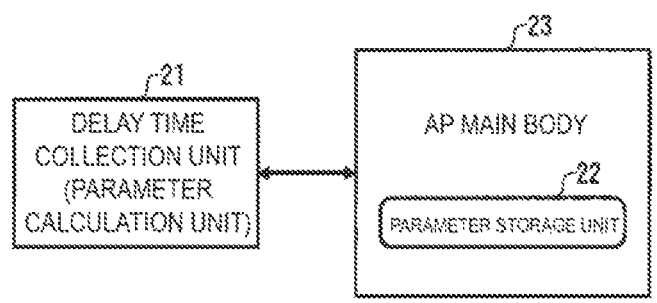
FIG. 2 is a diagram illustrating a configuration example for sequential priority degree adjustment.
Figure 3:
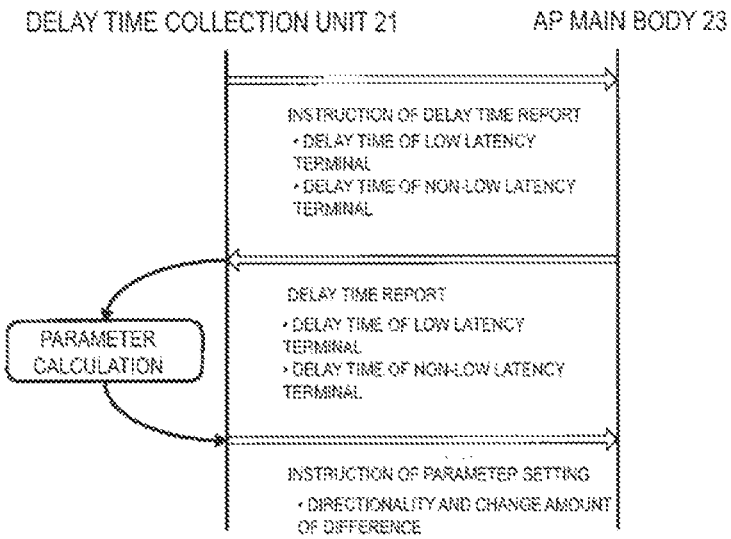
FIG. 3 is a diagram illustrating an algorithm for the sequential priority degree adjustment.

Alternatively, a method of controlling the "priority degree" to cause the "delay time" to have a target value may be provided. At that time, it is possible to sequentially adjust the "priority degree" based on the observation result of the delay time. Specifically, as illustrated in FIG. 2, the method is performed by a delay time collection unit 21 including a parameter calculation unit, and an AP main body 23 including a parameter storage unit 22. As illustrated in FIG. 3, in its algorithm, the delay time collection unit 21 issues an instruction to report the delay times of the low latency terminal and the non-low latency terminal to the AP at an appropriate time. The AP that received the instruction reports the measured delay time to the delay time collection unit 21. Then, the delay time collection unit 21 determines whether to increase or decrease the parameter from the reported delay time, and transmits the directionality and the change amount of the difference in the delay time to the AP. The AP stores a value obtained by adding the difference to the parameter value which has been originally held, in the parameter storage unit 22. The AP sets a parameter of the next buffer operation with reference to the parameter storage unit 22. A desired delay time is obtained by repeating such an operation until the delay time reaches the desired delay time.

A specific control example of the "priority degree" will be described. As a first method of controlling the access authority acquisition probability of a packet, an example of priority control of EDCA of a wireless LAN will be described. Regarding the higher priority degree packets and lower priority packets in EDCA, it is possible to adjust the access authority acquisition probability in a radio section and to control the priority degree, by changing parameters of CWmin and CWmax, which are the minimum value and the maximum value, respectively, of contention window (CW) that determines the random backoff value for collision avoidance, AIFS according to category instead of DIFS that determines that the channel is idle state, and transmission opportunity (TxOP), which is a parameter indicating the exclusive channel usage period after the access authority to the channel is acquired. For example, it is possible to increase the access authority acquisition probability in a radio section by setting CWmin, CWmax, and AIFS to small values. On the contrary, the number of frames that can be transmitted after the access authority acquisition is increased by setting TxOP to a large value, and this is equivalent to the increase of the access authority acquisition probability in a radio section.

Figure 4:
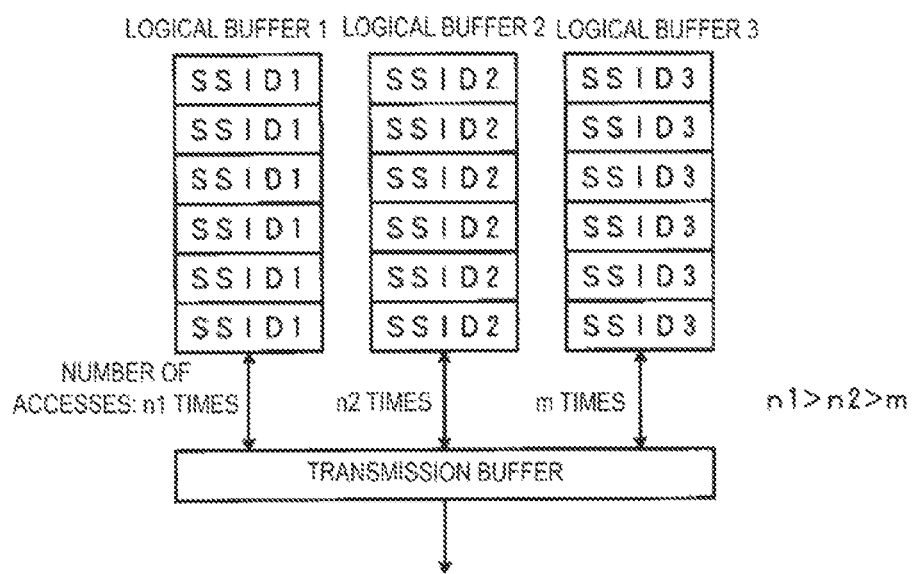
FIG. 4 is a diagram illustrating an example of a second method which prioritizes transmission of a packet.

FIG. 4 is a diagram illustrating an example of the second method of prioritizing transmission of a packet.

In FIG. 4, when the transmission buffer is empty, the rate at which the packet is extracted from the logical buffer 1, 2, and 3 is set to n1 times for the logical buffer 1, n2 times for the logical buffer 2, and m times for the logical buffer 3, and, in this manner, priority controls is performed by changing the frequency percentage of entering the packet into the transmission buffer. At this time, n1, n2, and m (n1>n2>m in this example) are parameters to be adjusted. In a case where the delay time of the packet in the low latency terminal A is longer than assumed, n1 may be increased. In a case where the delay time is shorter than assumed, n1 may be decreased.

Furthermore, n1, n2, and m are changed considering the input traffic amount of the packets of the low latency terminals A and B and the packets of the non-low latency terminal C, and thus it is possible to control the delay times of the packets of the low latency terminals A and B and to suppress the delay times to the target delay times.

In a case where the delay time of a leading packet in the buffer that stores packets of the low latency terminals A and B is longer than a predetermined time, a method of preferentially entering the leading packet into the transmission buffer may be provided. Such a determination may be performed by the number of waiting packets in the buffer instead of the delay time of the leading packet in the buffer.

Figure 5:
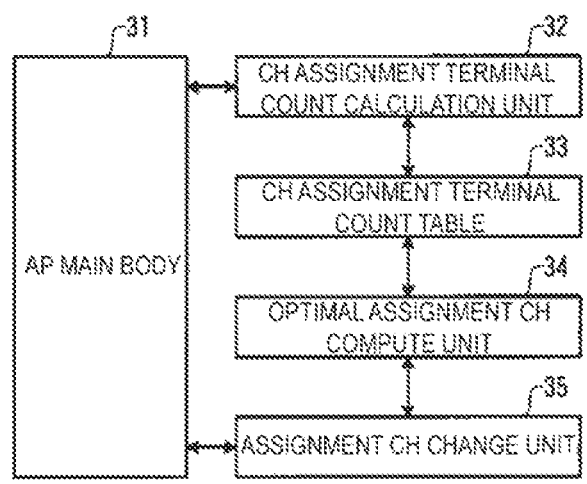
FIG. 5 is a diagram illustrating a configuration example of the AP.

FIG. 5 illustrates a configuration example of the AP.

In FIG. 5, the AP is configured by an AP main body 31 including random access control unit and a CH assignment terminal count calculation unit 32, a CH assignment terminal count table 33, an optimal assignment CH compute unit 34, and an assignment CH change unit 35 as terminal assignment destination control unit according to the present invention.

The CH assignment terminal count calculation unit 32 measures the number of assigned terminals for each communication channel CH and stores the measured number of assigned terminals, in the CH assignment terminal count table 33. The optimal assignment CH compute unit 34 computes the number of terminals which are to be assigned and are evenly distributed for each SSID assigned to the communication channel CH. Assignment destination terminal information that is currently set is compared to optimal assignment destination terminal information calculated by the optimal assignment CH compute unit 34. If there is a change, an assignment destination change processing is activated for the assignment CH change unit 35. In a case where the number of low latency terminals or non-low latency terminals that are assigned for each SSID is changed, the terminals are evenly assigned again into a plurality of communication channels based on the calculation of the optimal assignment CH compute unit 34.

REFERENCE SIGNS LIST

21 Delay time collection unit
22 Parameter storage unit
23, 31 AP Main body
32 CH assignment terminal count calculation unit
33 CH assignment terminal count table
34 Optimal assignment CH compute unit
35 Assignment CH change unit

The invention claimed is:

1. A random access radio communication system configured to perform downlink communication from a radio base station to radio terminals by random access, wherein
the radio terminals include one or more radio terminals (referred to as "low latency terminals" below) requiring low latency and one or more radio terminals (referred to as "non-low latency terminals" below) not requiring low latency, and
the low latency terminals and the non-low latency terminals are configured to be distinguished by service set identifiers (SSIDs),
the system comprising:
a terminal assignment destination control unit configured to distinguish the low latency terminals and the non-low latency terminals in accordance with the SSIDs and evenly distribute the low latency terminals and the non-low latency terminals into a plurality of communication channels; and
a random access control unit configured to perform priority control on the low latency terminals and the non-low latency terminals for each of the plurality of communication channels so that the downlink communication in each of the low latency terminals satisfies a predetermined delay time.

2. The random access radio communication system according to claim 1, wherein
the random access control unit is configured to set an access control parameter causing an access authority acquisition probability of a radio section of each of the low latency terminals to be greater than an access authority acquisition probability of the radio section of each of the non-low latency terminals, or to set an access control parameter causing a frequency of inputting a downlink packet to a transmission buffer in each of the low latency terminals to be greater than a frequency of inputting a downlink packet to a transmission buffer in each of the non-low latency terminals.

3. The random access radio communication system according to claim 1, wherein
the low latency terminals are classified into a plurality of categories,
an individual SSID among the SSIDs is assigned to each of the low latency terminals, and
the terminal assignment destination control unit is configured to distinguish the low latency terminals of the plurality of categories and the non-low latency terminals in accordance with the SSIDs and to evenly distribute the low latency terminals of the plurality of categories and the non-low latency terminals into the plurality of communication channels.

4. The random access radio communication system according to claim 1, wherein
the terminal assignment destination control unit is configured to evenly distribute the low latency terminals and the non-low latency terminals into the plurality of communication channels again, in a case where the number of the low latency terminals to be assigned or the number of the non-low latency terminals to be assigned for each of the SSIDs is changed.

5. A random access radio communication method of performing downlink communication from a radio base station to radio terminals by random access, wherein the radio terminals include one or more radio terminals (referred to as "low latency terminals" below) requiring low latency and one or more radio terminals (referred to as "non-low latency terminals" below) not requiring low latency, and the low latency terminals and the non-low latency terminals are configured to be distinguished by service set identifiers (SSIDs), the method comprising:

distinguishing the low latency terminals and the non-low latency terminals in accordance with the SSIDs and evenly distributing the low latency terminals and the non-low latency terminals into a plurality of communication channels; and performing priority control on the low latency terminals and the non-low latency terminals for each of the plurality of communication channels so that the downlink communication in each of the low latency terminals satisfies a predetermined delay time.

6. The random access radio communication method according to claim 5, wherein in a case where the priority control is performed, an access control parameter causing an access authority acquisition probability of a radio section of each of the low latency terminals to be greater than an access authority acquisition probability of the radio section of each of the non-low latency terminals is set, or an access control parameter causing a frequency of inputting a downlink packet to a transmission buffer in each of the low latency terminals to be greater than a frequency of inputting a downlink packet to a transmission buffer in each of the non-low latency terminals is set.

7. The random access radio communication method according to claim 5, wherein the low latency terminals are classified into a plurality of categories, an individual SSID among the SSIDs is assigned to each of the low latency terminals, and in a case where the low latency terminals and the non-low latency terminals are distinguished in accordance with the SSIDs, the low latency terminals of the plurality of categories and the non-low latency terminals are distinguished in accordance with the SSIDs and the low latency terminals of the plurality of categories and the non-low latency terminals are evenly distributed into the plurality of communication channels.

8. The random access radio communication method according to claim 5, wherein in a case where the low latency terminals and the non-low latency terminals are distinguished in accordance with the SSIDs, the low latency terminals and the non-low latency terminals are evenly distributed into the plurality of communication channels again, in a case where the number of the low latency terminals to be assigned or the number of the non-low latency terminals to be assigned for each of the SSIDs is changed.

* * * * *